July 30, 1940.　　　　K. M. HAMMELL　　　　2,209,693
COVER OPERATING MEANS FOR RECEPTACLES
Filed Oct. 4, 1939　　　　2 Sheets-Sheet 1
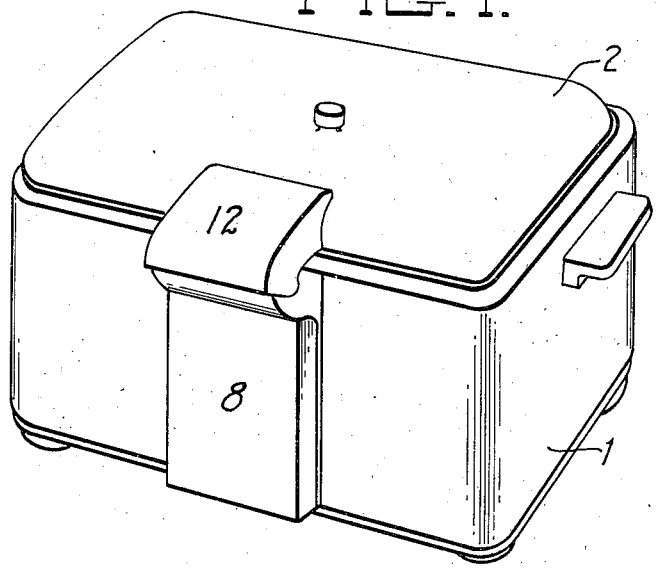
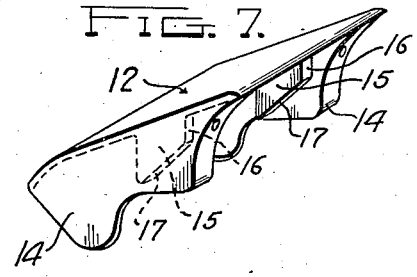
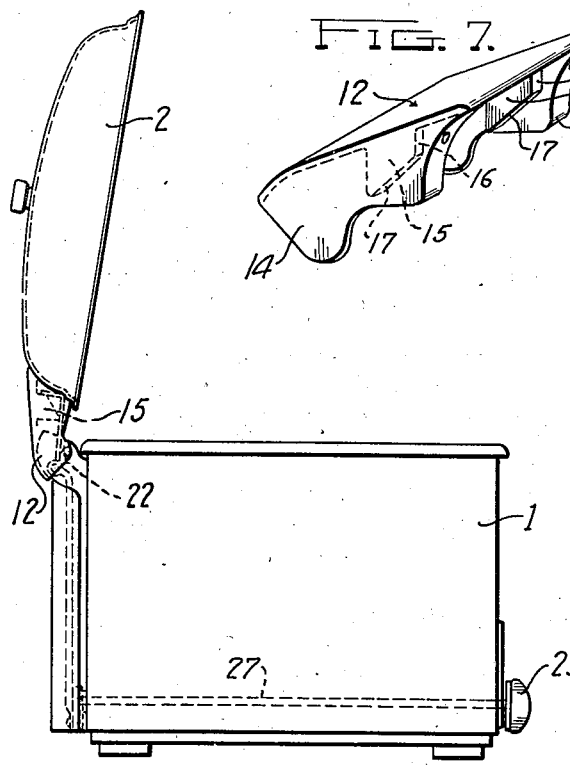
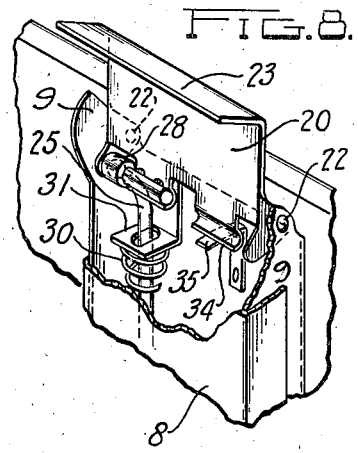
Inventor
Kemper M. Hammell
By Owen & Owen
Attorney July 30, 1940.  K. M. HAMMELL  2,209,693
COVER OPERATING MEANS FOR RECEPTACLES
Filed Oct. 4, 1939    2 Sheets-Sheet 2
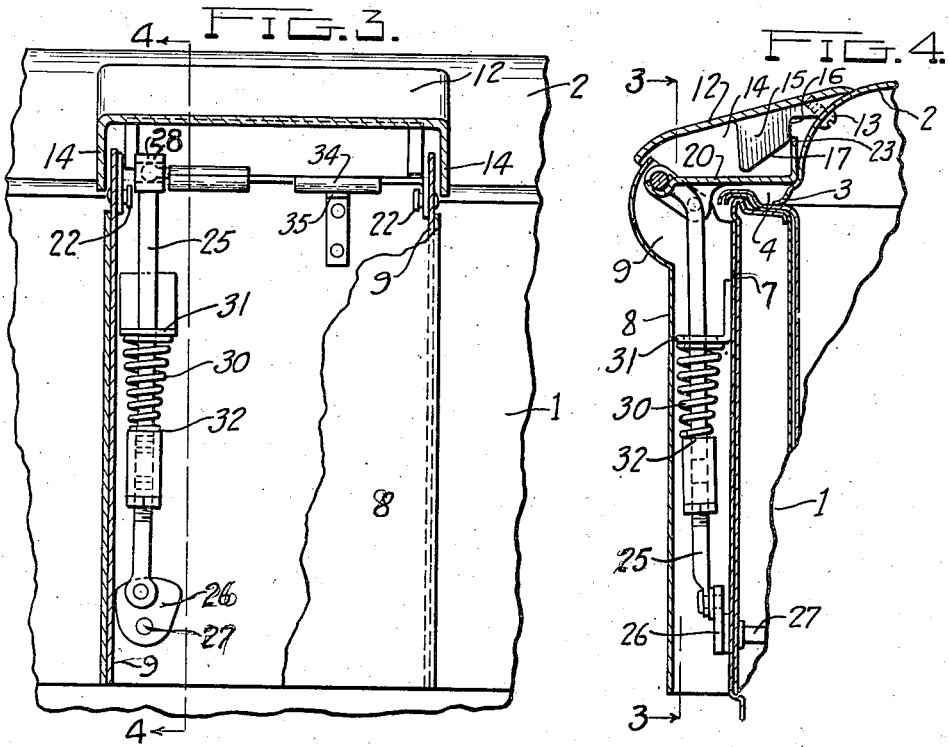
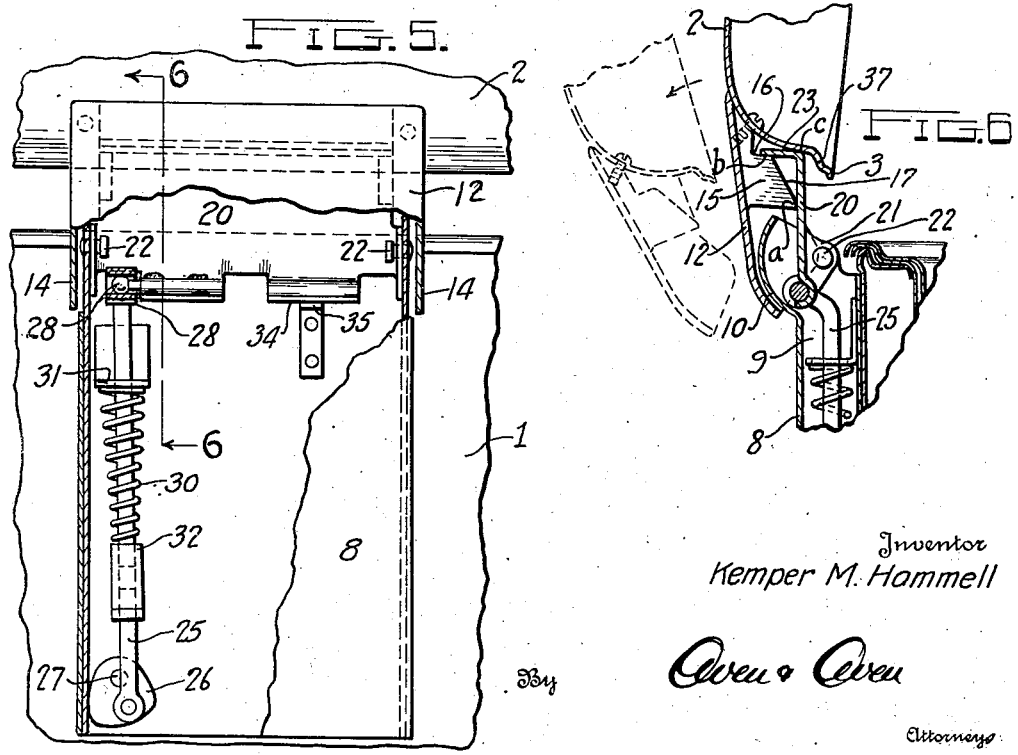
Inventor
Kemper M. Hammell
By Owen & Owen
Attorneys Patented July 30, 1940

2,209,693

UNITED STATES PATENT OFFICE 2,209,693

COVER OPERATING MEANS FOR RECEPTACLES

Kemper M. Hammell, Toledo, Ohio, assignor to The Swartzbaugh Manufacturing Company, Toledo, Ohio, a corporation of Ohio Application October 4, 1939, Serial No. 297,889

4 Claims. (Cl. 220—36)

This invention relates to operating means for the hinged covers of receptacles, and particularly for the covers of cooking utensils on devices which may become heated in use or from which steam may arise when the cover is open.

The primary object of the invention is the provision of a simple and novel cover operating means of the character described which may be easily controlled by the operator from a convenient point without the receptacle and below its top, so that it is not necessary for the operator to grasp the cover, which may be hot, or to expose the hand and arm during the opening or closing operation to steam rising from the receptacle.

A further object of the invention is the provision of a connection between the cover and its operating means and hinge which is capable of being easily and quickly disconnected and also reassembled without the use of tools to facilitate washing of the different parts and maintaining a sanitary condition.

Other objects and advantages of the invention will be apparent from the following detailed description, and from the accompanying drawings, in which—

Figure 1 is a rear perspective elevation of a cooker embodying the invention, with the cover closed; Fig. 2 is an end elevation thereof, with the cover in open position; Fig. 3 is an enlarged fragmentary rear elevation of the cooker, with a part in section on the line 3—3 in Fig. 4; Fig. 4 is a fragmentary section on the line 4—4 in Fig. 3, with the cover in closed position; Fig. 5 is a fragmentary rear sectional view similar to Fig. 3, with the cover in open position; Fig. 6 is a fragmentary section on the lines 6—6 in Fig. 5; Fig. 7 is a perspective view of the hinge housing, which is fixed to the cover, and Fig. 8 is a fragmentary rear perspective view of the cooker body and cover actuating means and with the latter in open cover position and with the cover removed therefrom.

Referring to the drawings, 1 designates the body of a receptacle, such for instance as an electric cooker, and 2 the cover thereof. The cover is shown as having a bottom or lower edge flange 3 angling outwardly and downwardly and adapted to seat in a recess 4 provided around the inner top edge of the receptacle body wall (Fig. 4).

A U-shaped housing 7 is attached to the rear wall of the receptacle body at its outer side and has the opposite side walls 9 extending outward from the body wall in rigid relation thereto. The open end of the housing 7 is closed by a mating housing 8 which has the rearwardly extending arcuate enlargement 10.

A housing 12 is fixed to the rear edge portion of the cover 2, being secured thereto, in the present instance, by screws 13, and projects rearwardly therefrom in covering relation to the upper end of the housing 8. The rear edge of the housing 12 overhangs the arcuate upper rear edge portion of the housing 8, and the downwardly extending side walls 14 of the housing 12 overlap the side walls 9 of the housing 7, so that the housing 12 may swing rearwardly and downwardly over the upper end of the housing 8 when the cover is raised. The housing 12 has lugs 15 projecting downwardly from its top portion near its inner end to form shoulders 16 facing the adjacent edge of the cover. The ends of the lugs 15 are preferably tapered upwardly and forwardly, as shown at 17, for the purpose hereinafter described.

A cover actuator 20 of lever form is fulcrumed within the upper end of the housing 7 to the side walls 9 thereof and has its forward end, in the present instance, detachably connected to the cover 2 within the housing 12. This actuator, in its present embodiment, is of substantially flat plate form with ears 21 extending down from its side edges and carrying or receiving the pivots 22, which pivotally connect the actuator to the side walls of the housing 7. The actuator plate extends forward a greater distance from the pivot axis than it does to the rear so that it forms a long forward arm and a short rearward arm. The front edge of the actuator plate 20 is provided with an upstanding flange 23 to render the plate of L-form to facilitate attaching to the cover, as hereinafter described. The rear end of the actuator plate is attached to the upper end of an actuator rod 25 which extends down within the housing 7 and pivotally connects at its lower end to a cam rocker 26 in offset relation to the control shaft 27 carrying such rocker. A suitable universal joint connection 28 is preferably provided between the rear end of the actuator 20 and the rod 25. The control shaft 27 extends forward through the lower portion of the receptacle body 1, being journaled in the front and rear walls thereof, and having an exposed knob or handle 29 at its forward end (Fig. 2). A coiled expansion spring 30 encircles the rod 25 between a fixed stop 31 through which the rod projects and a subjacent shoulder 32 on the rod. The spring is thus caused to exert a downward pull on the rod to counterbalance the weight of the cover and to facilitate an opening action.

The cam 26 is prevented from making a complete turn due to the cam projections thereof striking an adjacent side wall 9 of the housing 7, as shown in Figs. 3 and 5. When the cover is in closed position the pivotal connection between the rod 25 and cam is above the control shaft and in vertical off-center position thereto relative to stop position, as shown in Fig. 3, so that the downward thrust of the spring on the rod 25 will be prevented from effecting or tending to effect an opening of the cover. When the cover is in full open position, and the cam 26 has reached its lower stop position, as shown in Fig. 5, the pivotal connection between the rod 25 and cam is slightly outward from vertical register with the axis of the control shaft so that there will be no locking tendency of the operating connection should the cover be swung by hand from open position.

For the purpose of connecting the cover 2 and actuator 20 together in an easily detachable manner, the latter is provided at its forward end with the upturned flange 23, which is adapted to engage the front of the housing lugs 15, while the forward edge of the actuator plate at its elbow or the point of angle of the flange 23 therefrom bears forwardly against the rear edge of the cover in the seat 37 formed by the cover flange 3 at its inner edge. The actuator has in effect a sliding connection with the cover and its housing 12, such connecting action being facilitated by the inclined edges 17 of the lugs 15, which guide the flange 23 to its locking position with the lug shoulders 16. When the cover and actuator 20 are in fully raised position, the actuator is prevented from further rearward swinging movements and the cover may be easily sprung out of engagement therewith by applying a rearward pressure thereto. This causes the seat 37 at the inner edge of the cover flange 3 to swing rearward out of holding engagement with the elbow end of the actuator plate and this permits the flange 23 to move out of engagement with the lug shoulders 16, after which the cover may be drawn outwardly away from the actuator. The cover may be quickly engaged to the actuator by simply placing the cover housing 12 over the actuator when in upturned position, as shown in Fig. 6, and sliding the cover down on the actuator so that the flange 23 rides upward on the lug incline 17 and into very slight engagement with the shoulder 16, while the elbow end of the actuator plate is moving into holding engagement with the cover seat 37.

It is desirable to provide a lost motion connection between the cover 2 and actuator element 20 when the cover is in closed or seated position so as to permit the cover to find its seat on the body independently of the actuating means. For this purpose, the lugs 15 on the cover housing 12 have the free ends at the lower ends of the tapers 17 projected into position so that they are slightly spaced from the body portion of the actuator 20 when the cover is closed, as shown in Fig. 4. When the actuator is initially moved to raise the cover, its forward end first moves slightly upward relative to the cover, by reason of the actuator flange 23 sliding upward on the forward edge of the lug or lugs 15, and it is not until the actuator has moved in such manner sufficiently for its body portion to engage the projecting ends of the lug or lugs 15, as shown in Fig. 6, that the cover begins to raise. With this lost motion action between the cover and actuator, it is apparent that when the cover, during a closing movement, has moved to substantially seating position on the receptacle, the actuator, by a slight continuing movement, will move out of engagement with the lugs 15 and thus, in effect, release the cover so that it may seat squarely on the receptacle without any retarding action due to its connection with the actuating means. It is apparent that when the actuator engages the outer ends of the lugs 15, it has a three-point leverage connection with the cover at points a, b and c (Fig. 5), and that this is released to permit a free seating of the cover on the receptacle when the cover is in closed position. The lost motion connection performs the additional function of slightly lifting the cover during engagement of the actuator so that the housing 12 is raised with respect to the upper end of housing 8 and thus prevented from scraping against the latter during its swinging movement. The lifting is accomplished by the L-shaped actuator moving into engagement first with the lugs 15 and then wedging its extension 23 between the back surface 16 of the lugs and the cover portion 37. As this last wedging takes place, the cover is slightly raised before it begins to swing with continued movement of the actuator.

In the use of the cover control embodying the invention, a turning of the control shaft 27 to the right from the position shown in Fig. 3 will impart a downward movement to the rod 25 and an upward rearward swinging of the actuator 20 and attached cover 2 from the closed position best shown in Fig. 4. When the cam 26 has reached the position shown in Fig. 5, with the connection between the rod and cam just short of vertical centering relation to the shaft axis, a portion of the cam will have moved into stop engagement with the adjacent wall of the housing 8, thus limiting the opening movement of the cover. A turning of the shaft 27 and its cam to the left from the open cover position shown in Fig. 5 will impart a closing movement to the actuator 20 and through it to the cover. When it is desired to remove the cover from the actuator 20 to facilitate washing, or for any other purpose, the cover is first swung to its full open position and the operator then grasps the cover and swings it rearward relative to the actuator as indicated by dotted lines in Fig. 7, so as to disconnect the cover and its housing 12 from the actuator.

It is apparent that with the use of my control, the operator can easily and quickly open the cover of a cooker, or other receptacle, by simply turning the control knob 29 and without taking hold of the cover. In fact, with the illustrated embodiment of the invention, it is impossible to open the cover by grasping it by hand. This prevents the danger of burning the operator either by reason of grasping a highly heated cover or by moving the hand and arm over the top of the receptacle and in the path of emitting steam during a hand opening of the cover. The releasable feature of the actuator and cover is a desirable but not necessary incident to the cover control, which facilitates easy and quick removal of the cover from the receptacle body for the purpose of washing and without the use of tools.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a receptacle of the class described, a body having an open top, a cover for said body having a rearwardly extending open bottom part at its rear edge with a downwardly extending lug therein and having a seat in its rear edge below said part, an actuator pivoted to said body adjacent to its upper rear edge, said actuator being of lever form with a short arm extending rearwardly from its pivot and with its long arm extending forwardly in seating engagement with said cover seat and with its free end extending upward from such seat in holding engagement with the front side of said lug, said cover being releasable from said actuator by forcefully swinging the cover in an opening direction relative to the actuator, and manually operable means connected to the short arm of said actuator and operable to swing the cover to open position or from open position to closed position.

2. In a receptacle of the class described having an open top, a cover therefor and a body casing, a hinge connection between the rear edge portion of the cover and the adjacent portion of the body casing, said connection having a lever arm extending rearwardly of the hinge pivot, a rotatable control shaft mounted in the lower portion of said casing forwardly and rearwardly thereof and having a control handle at its front end and a rocker plate at its rear end, means on the casing with which said plate coacts to limit its turning to approximately one-half a revolution, a link connecting said lever arm and plate, pivoted to each, with the plate pivot disposed above the control shaft axis and slightly rearwardly of dead center toward the stop means when the cover is in closed position and being below the shaft axis and slightly forwardly of dead center position when the cover is in full open position whereby the cover is locked in closed position, except by rotation of said shaft, but is free in open position, and spring means acting to apply a predetermined cover opening pressure to said link connection and serving to hold the plate against its stop in the closed position.

3. In a receptacle of the class described having an open top, a cover therefor and a body casing, a hinge connection between the rear edge portion of the cover and the adjacent portion of the body casing, said connection having a lever arm extending rearwardly of its hinge pivot, manual control means connected to said lever arm and including a control shaft mounted in the lower portion of said casing forwardly and rearwardly thereof and having a control handle at its front end and a rocker member at its rear end, and a link connecting said rocker member and lever arm to impart opening and closing movements to the cover when the control shaft is turned in one direction or the other, means on the casing with which said rocker member coacts to limit its turning to approximately one-half a revolution, the pivotal connection between said link and rocker member being above the control shaft axis and slightly rearwardly of dead center toward the stop means when the cover is in closed position and being below the shaft axis and slightly forwardly of dead center position when the cover is in full open position whereby the cover is locked in closed position, except by rotation of said shaft, but is not locked in open position, and spring means acting on said control means to counter-balance the weight of the cover during opening and closing movements thereof, and to urge the rocker member against its stop in closed position.

4. In a receptacle of the class described having an open top, a cover therefor and a body casing, a hinge connection between the rear edge portion of the cover and the adjacent portion of the body casing, a rotatable control shaft mounted in the lower portion of said casing forwardly and rearwardly thereof and having a control handle at its front end and a rocker plate at its rear end, stop means to limit the rotation of the plate to approximately one-half a revolution, a link connecting said hinge at a point offset from the hinge axis and said plate and pivoted to each, with the plate pivot disposed to one side of the control shaft axis and slightly beyond dead center toward the stop means when the cover is in closed position and being to the opposite side of the shaft axis and slightly forwardly of dead center when the cover is in full open position whereby the cover is locked in closed position, except by rotation of said shaft, but is free in open position, and spring means acting to apply a predetermined cover opening pressure to said link connection and serving to hold the plate against its stop in closed position.

KEMPER M. HAMMELL.